(12) United States Patent
Roh

(10) Patent No.: US 10,320,960 B2
(45) Date of Patent: Jun. 11, 2019

(54) METAL FRAME AND METHOD OF MANUFACTURING THE METAL FRAME FOR THE MOBILE COMMUNICATION TERMINAL

(71) Applicants: Hyunseob Jaegal, Gwangju (KR); Chunghyun Roh, Seoul (KR); TIANJIN M&C ELECTRONICS CO., LTD., Tianjin (CN)

(72) Inventor: Chunghyun Roh, Seoul (KR)

(73) Assignees: TIANJIN M&C ELECTRONICS CO., LTD., Tianjin (CN); Hyunseob Jaegal, Gwangju (KR); Chunghyun Roh, Seoul (KR)

( * ) Notice: Subject to any disclaimer, the term of this patent is extended or adjusted under 35 U.S.C. 154(b) by 0 days.

(21) Appl. No.: 15/580,839

(22) PCT Filed: Aug. 12, 2015

(86) PCT No.: PCT/KR2015/008429
§ 371 (c)(1),
(2) Date: Dec. 8, 2017

(87) PCT Pub. No.: WO2016/204339
PCT Pub. Date: Dec. 22, 2016

(65) Prior Publication Data
US 2018/0343331 A1 Nov. 29, 2018

(30) Foreign Application Priority Data

Jun. 19, 2015 (KR) .................... 10-2015-0087437
Jun. 19, 2015 (KR) .................... 10-2015-0087438

(51) Int. Cl.
*H04M 1/02* (2006.01)

(52) U.S. Cl.
CPC ....... *H04M 1/0249* (2013.01); *H04M 1/0202* (2013.01); *H04M 1/0264* (2013.01); *H04M 1/0266* (2013.01); *H04M 1/026* (2013.01)

(58) Field of Classification Search
CPC ............. H04M 1/0266; H04M 1/0249; H04M 1/0264; A45C 11/00; B29C 45/14; B22D 17/00; B21C 23/08
See application file for complete search history.

(56) References Cited

U.S. PATENT DOCUMENTS

| | | | |
|---|---|---|---|
| 2008/0165485 A1* | 7/2008 | Zadesky | H04M 1/0252 361/679.02 |
| 2010/0142134 A1* | 6/2010 | Zadesky | H04M 1/0252 361/679.01 |

(Continued)

FOREIGN PATENT DOCUMENTS

| | | | |
|---|---|---|---|
| JP | 2008-183591 | 8/2008 | ............. B22D 17/22 |
| KR | 10-2009-0074448 | 7/2009 | ............. B29C 45/14 |

(Continued)

OTHER PUBLICATIONS

International Search Report (ISR) dated May 30, 2016 in PCT/KR2015/008429 with English translation.

*Primary Examiner* — Nathan S Taylor
(74) *Attorney, Agent, or Firm* — Harness, Dickey & Pierce, P.L.C.

(57) ABSTRACT

The present invention relates to a metal frame for a mobile communication terminal, manufactured using extruding and a die casting die. The metal frame for the mobile communication terminal, manufactured using extrusion and the die casting die includes a housing frame formed by cutting a metal preform having a square pipe shape obtained by extruding a metal material such as an aluminum alloy to have a square ring shape having a hollow square cross section to form an edge exterior of the mobile communica- (Continued)

tion terminal and a bracket frame formed by inserting the housing frame into the die casting die and injecting a molten metal thereinto to be a flat panel member which supports a display panel and a main board of the mobile communication terminal inside the housing frame.

19 Claims, 10 Drawing Sheets

(56) References Cited

U.S. PATENT DOCUMENTS

| | | | | |
|---|---|---|---|---|
| 2010/0254848 A1* | 10/2010 | Inoue | .................. | C22C 23/02 |
| | | | | 420/408 |
| 2013/0050918 A1* | 2/2013 | Zadesky | ............. | H04M 1/0252 |
| | | | | 361/679.01 |
| 2015/0096893 A1* | 4/2015 | Jeong | .................. | B22D 21/007 |
| | | | | 205/50 |
| 2016/0060731 A1* | 3/2016 | Hwang | .................. | C22C 21/02 |
| | | | | 420/541 |
| 2017/0087626 A1* | 3/2017 | Verreault | ............... | B22D 17/08 |
| 2017/0142239 A1* | 5/2017 | Bae | ....................... | G06F 1/1658 |
| 2017/0268112 A1* | 9/2017 | Akiyama | .......... | B29C 45/14311 |
| 2018/0109657 A1* | 4/2018 | Tang | .................... | H04M 1/0202 |

FOREIGN PATENT DOCUMENTS

| | | | | |
|---|---|---|---|---|
| KR | 10-2014-0088259 | | 7/2014 | ............. A45C 11/00 |
| KR | 10-1453067 | | 10/2014 | ............. A45C 11/00 |
| KR | 10-2014-0142104 | | 12/2014 | ............. H04B 1/38 |
| KR | 2016143905 A | * | 6/2015 | |

\* cited by examiner

[Fig. 1]
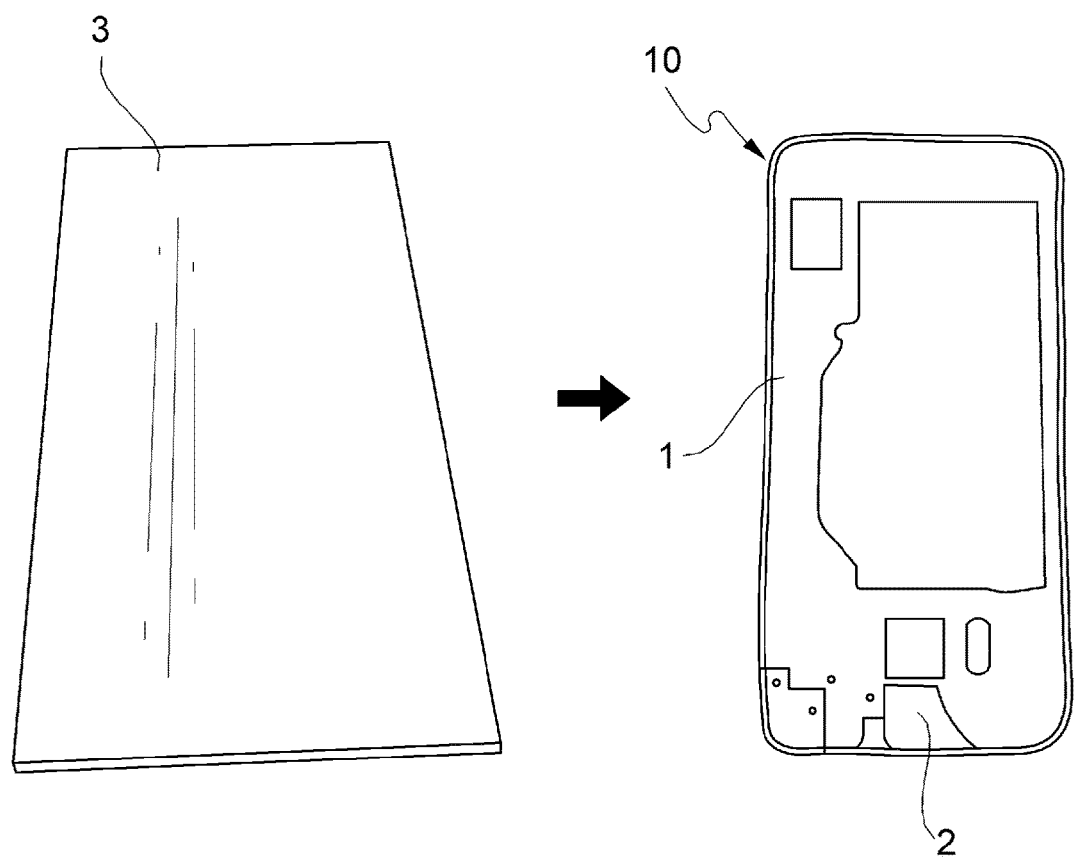

[Fig. 2]
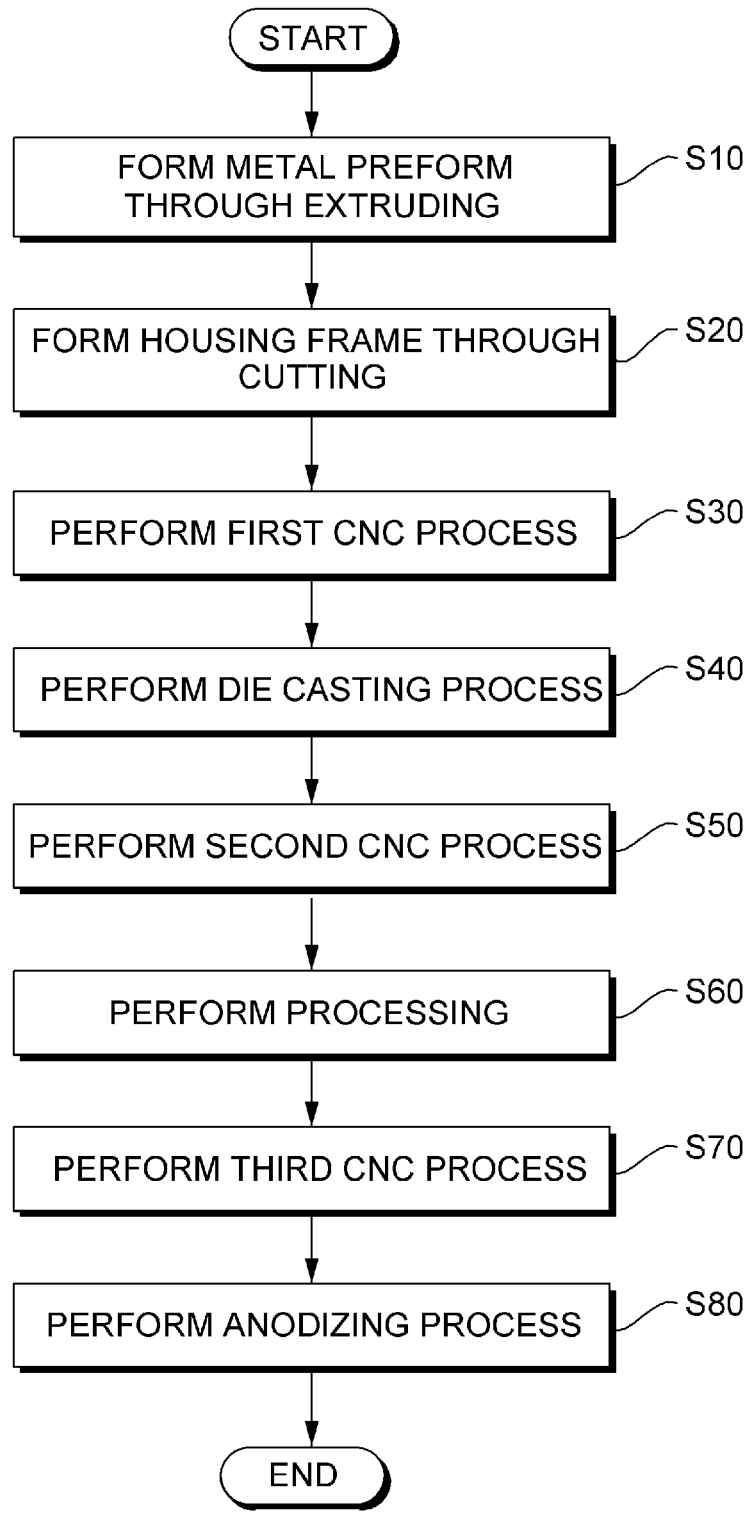

[Fig. 3]
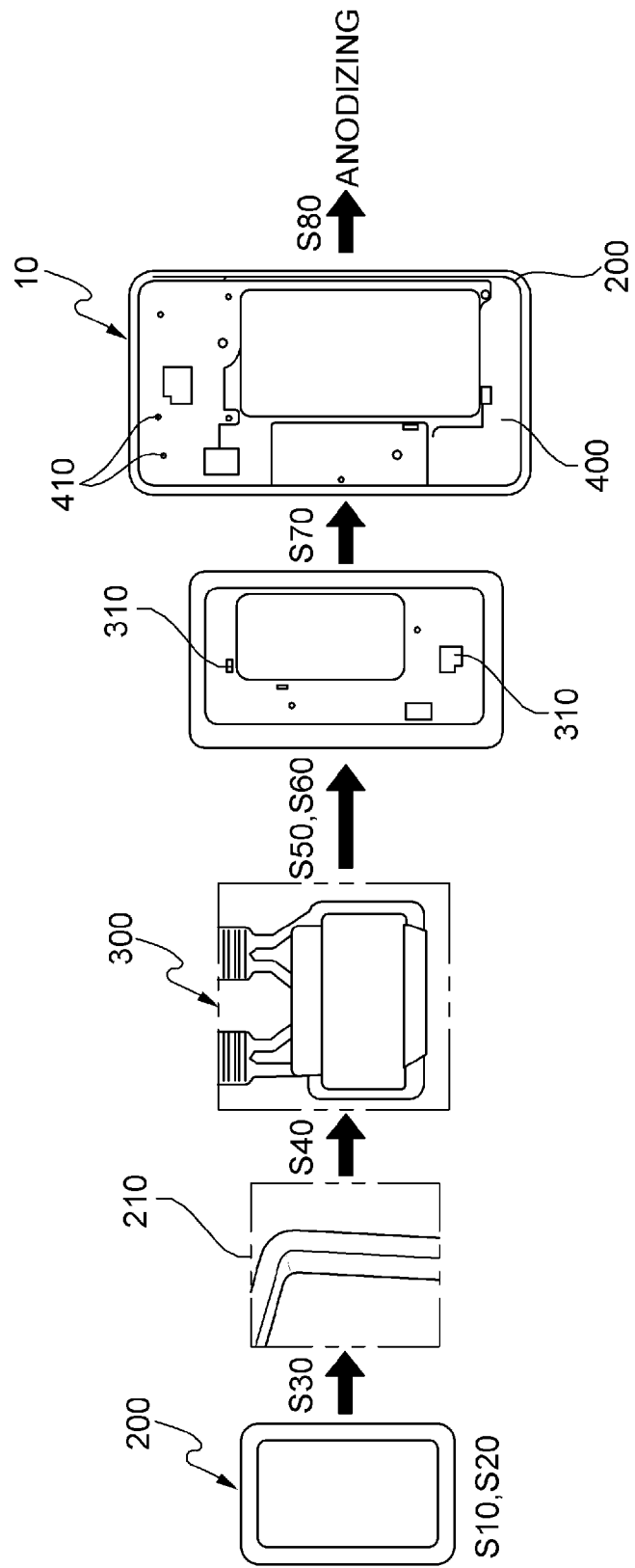

[Fig. 4]
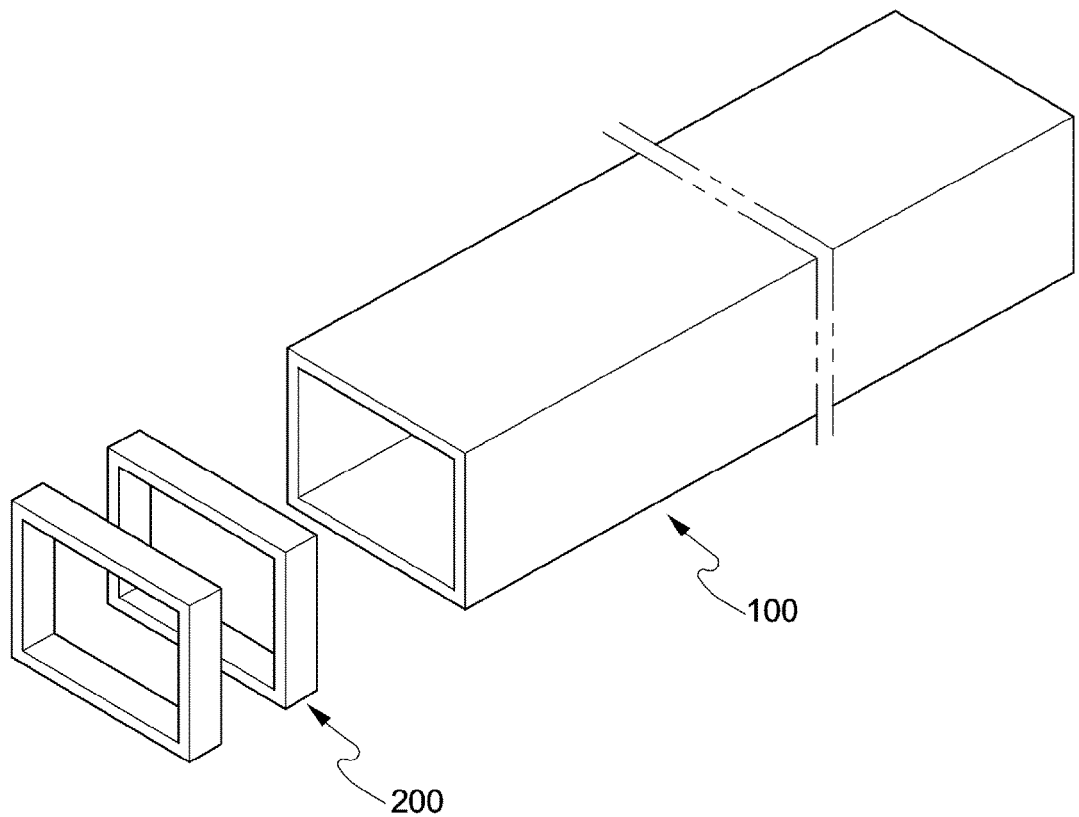
[Fig. 5]
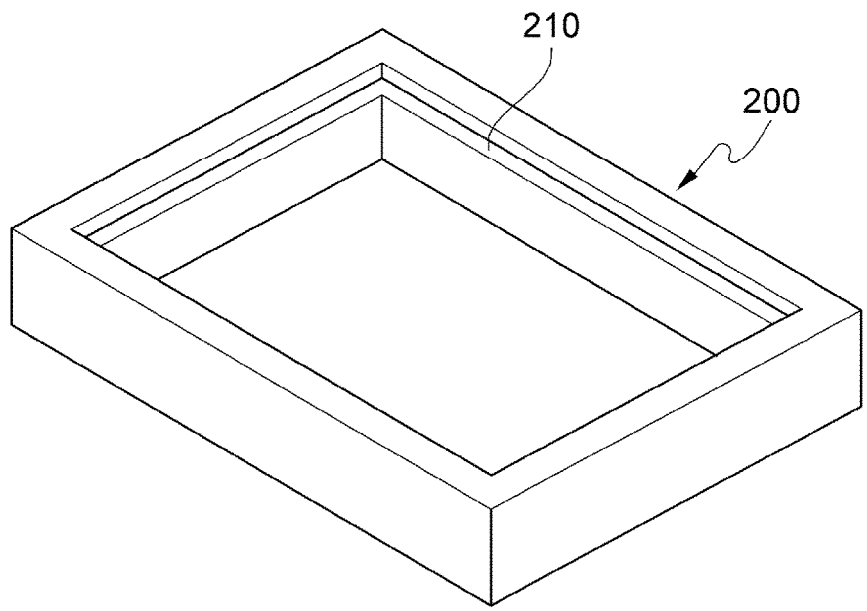

[Fig. 6]
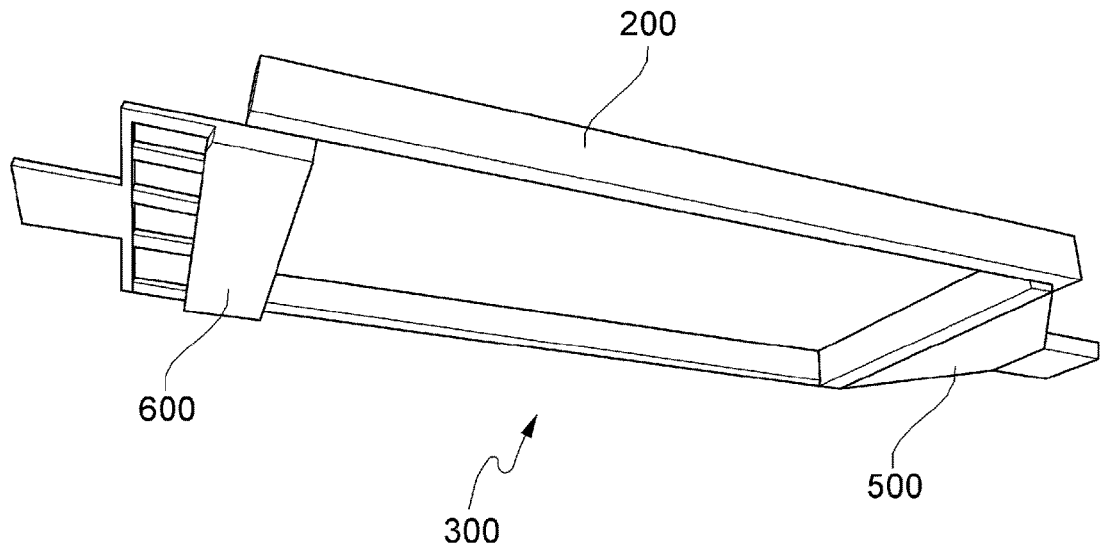
[Fig. 7]
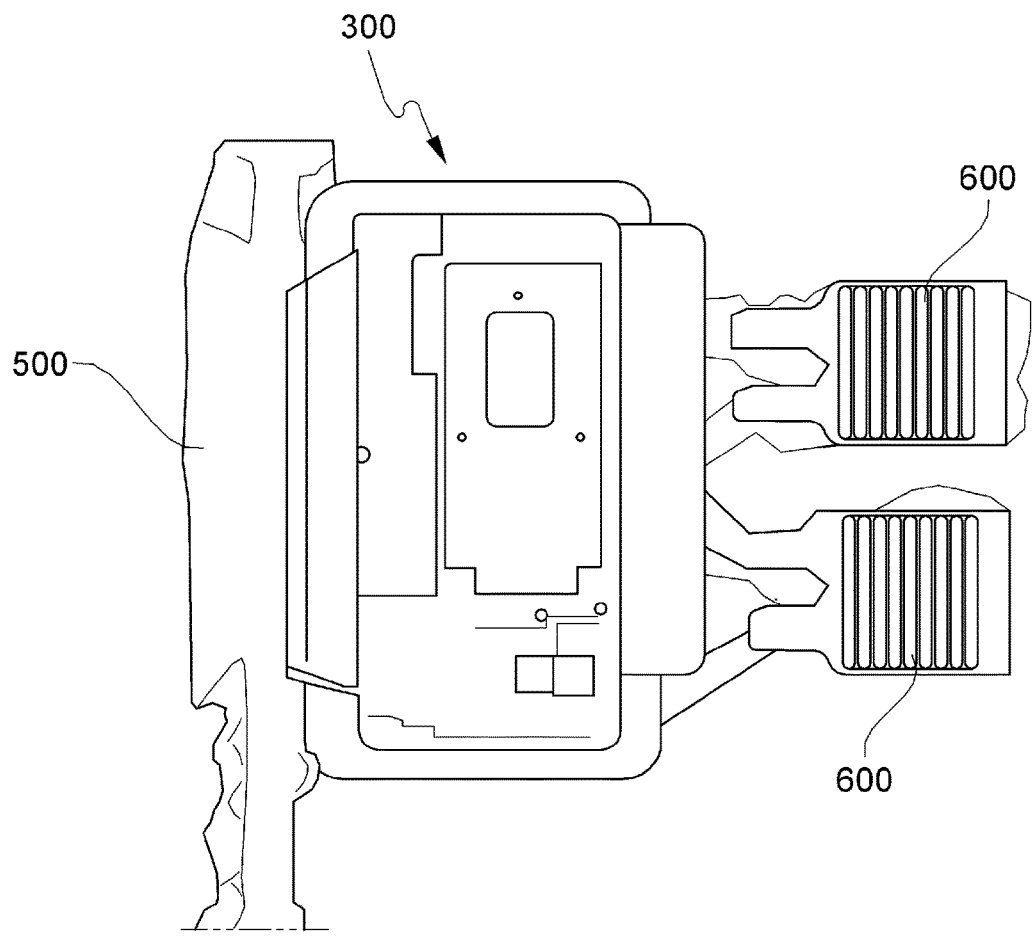

[Fig. 8]
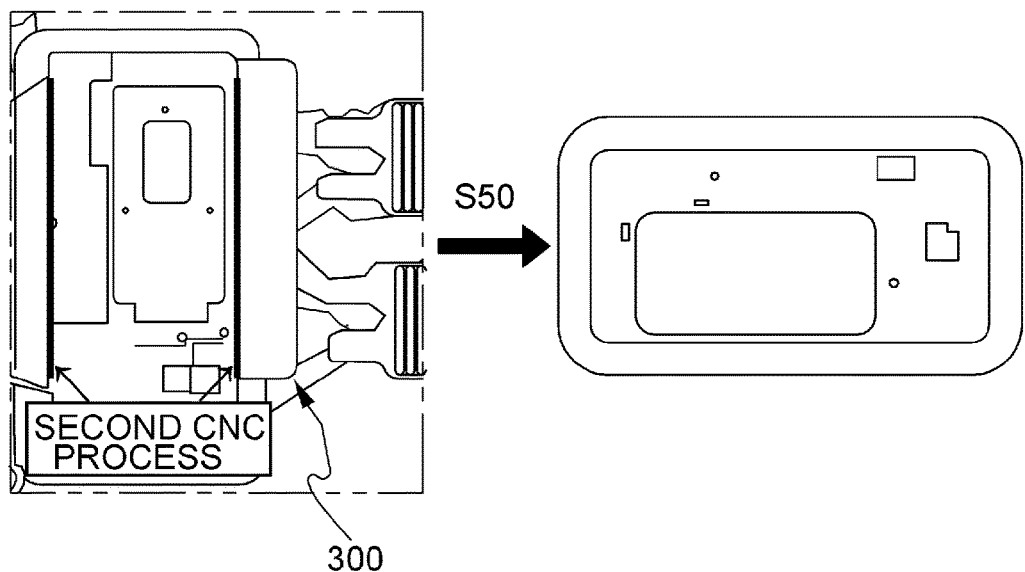
[Fig. 9]
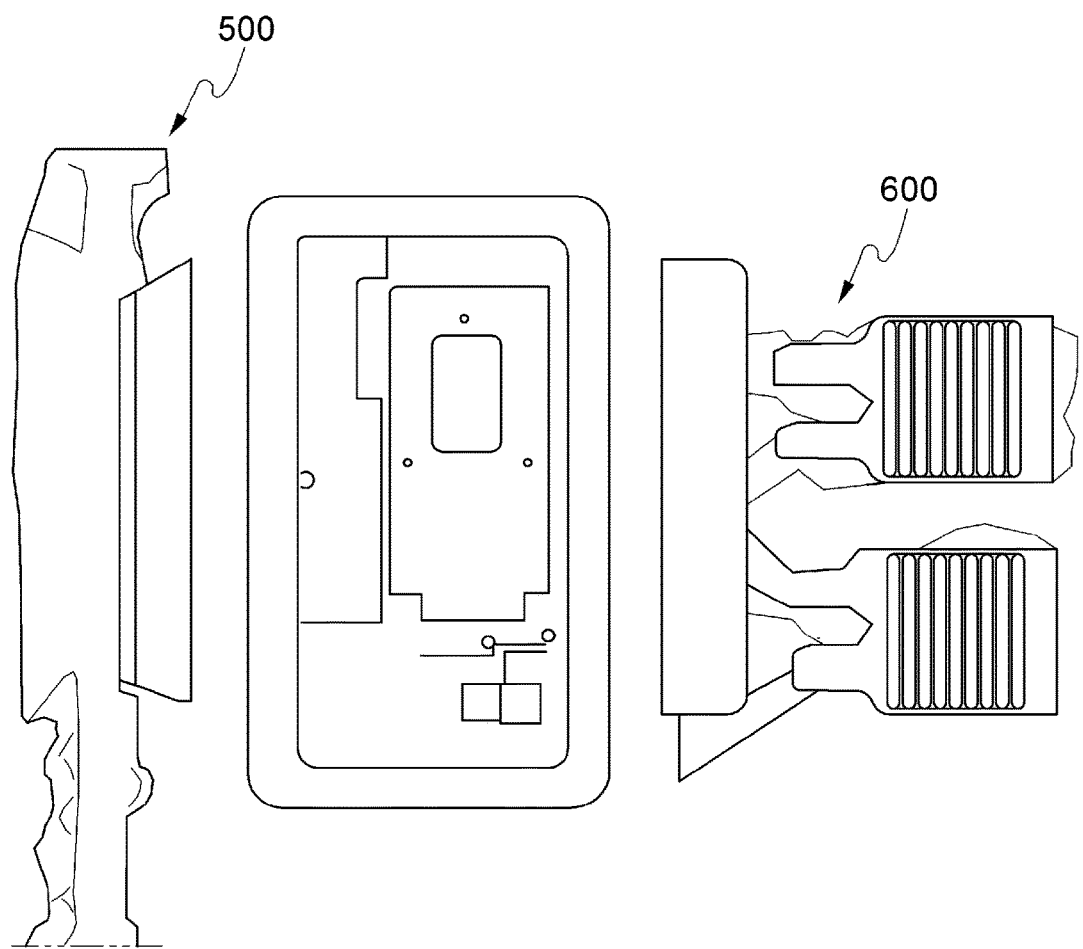

[Fig. 10]
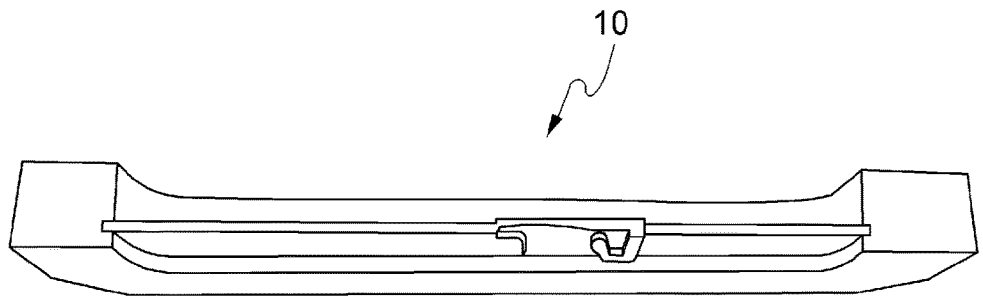
[Fig. 11]
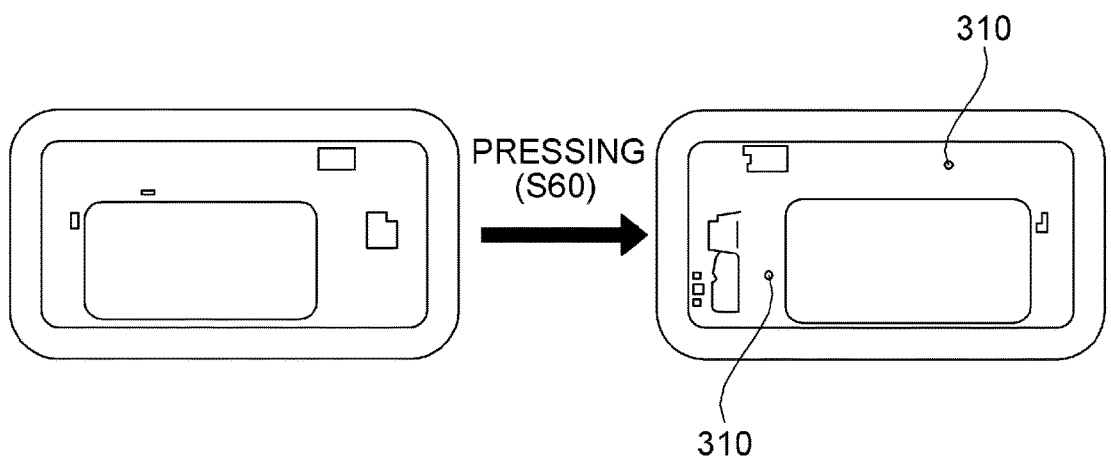
[Fig. 12]
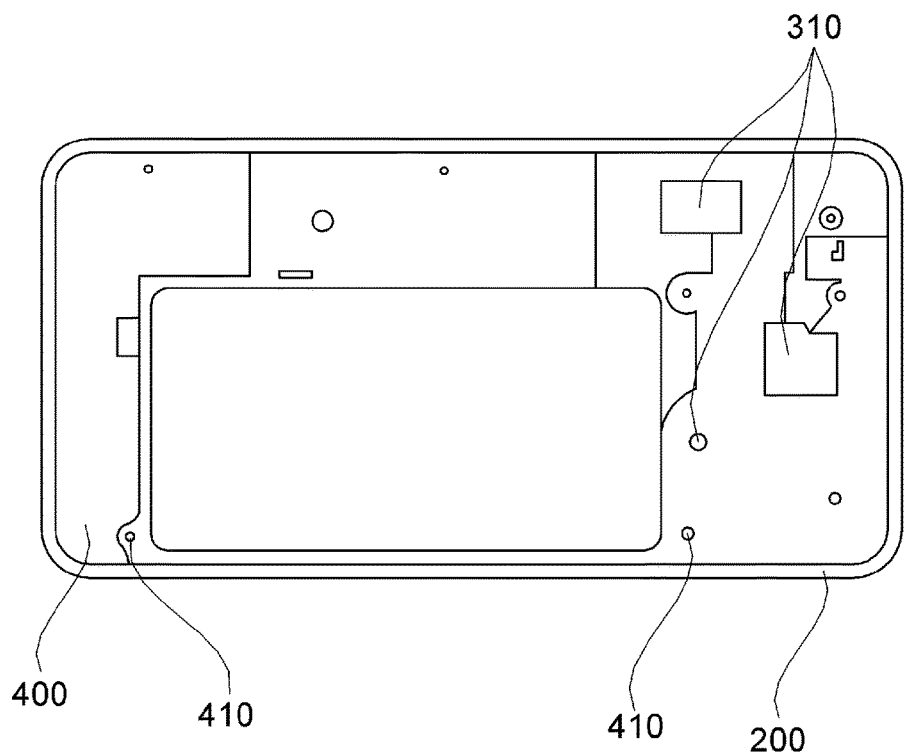

[Fig. 13]
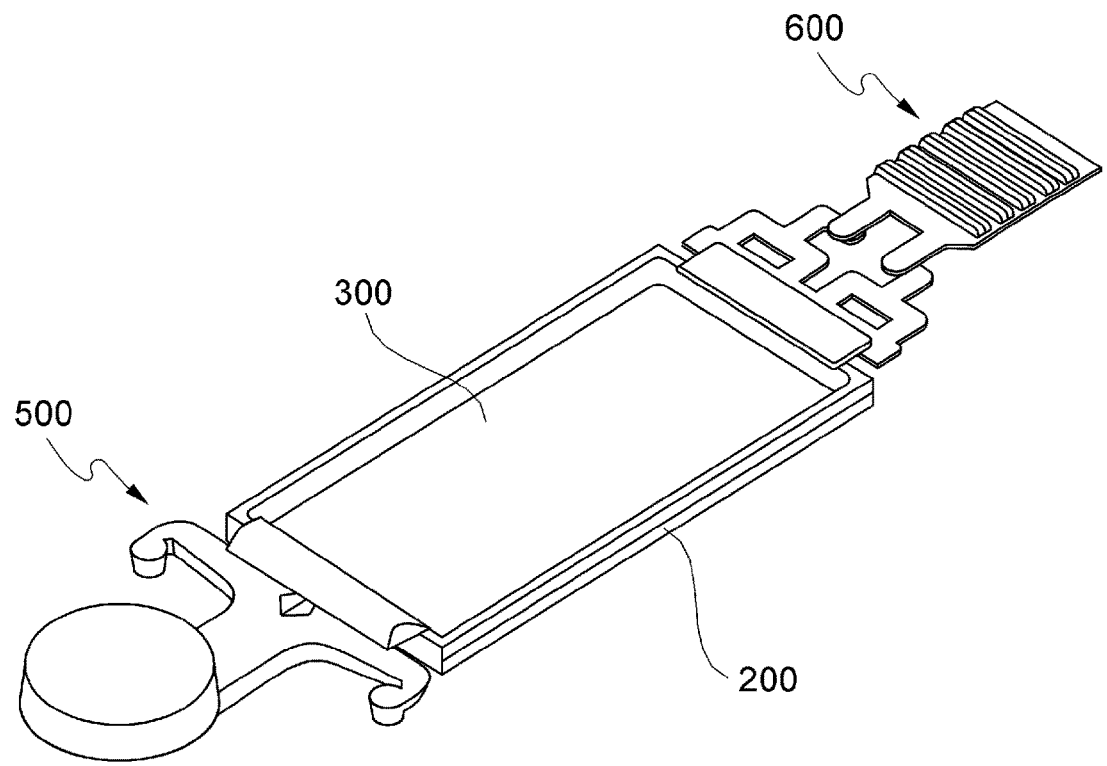

[Fig. 14]
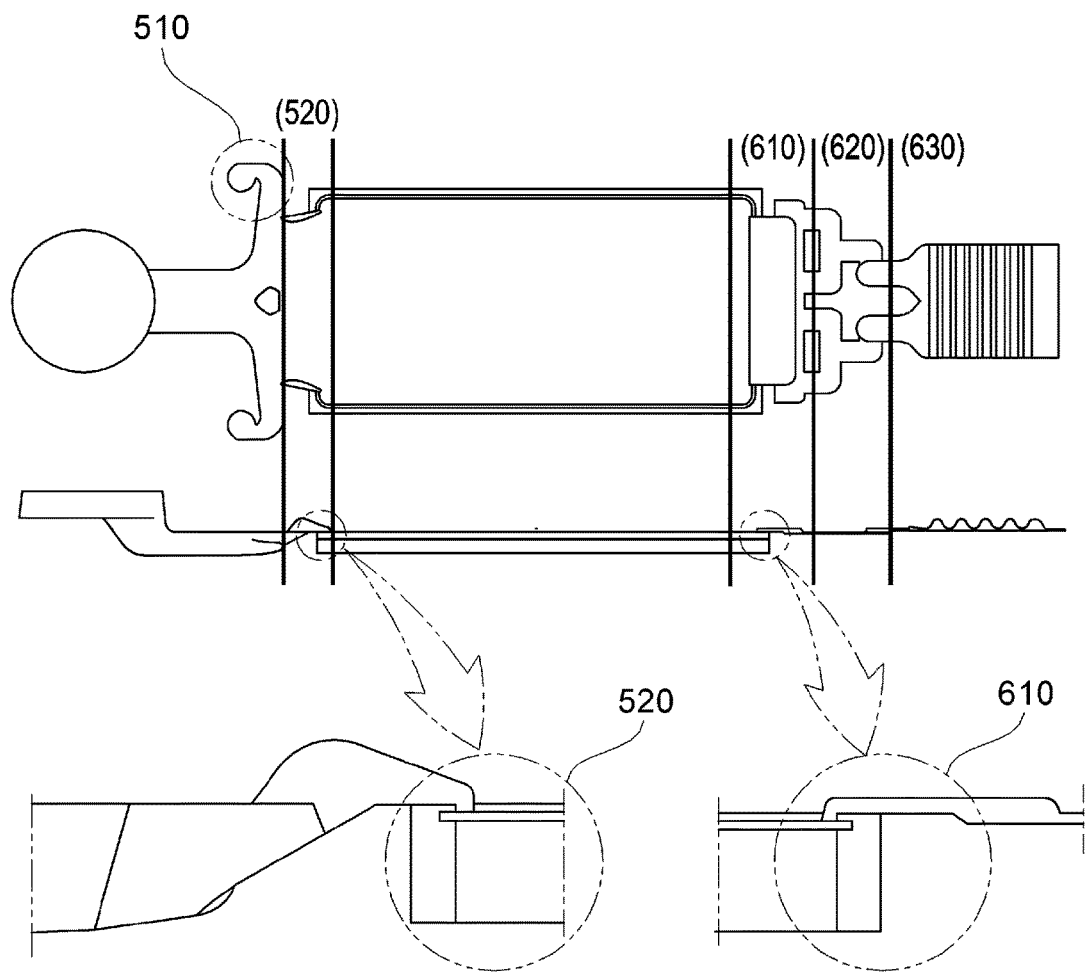

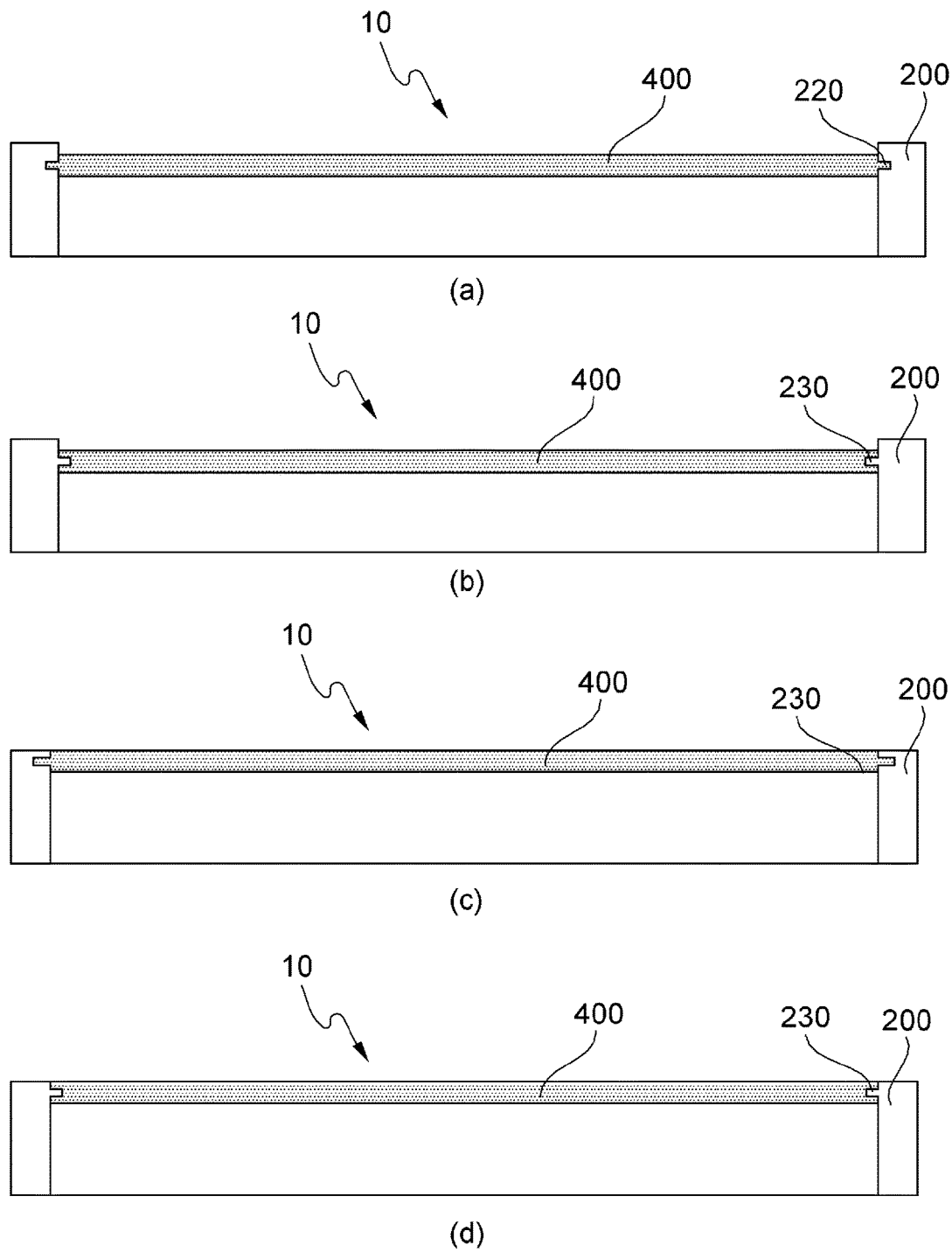
[Fig. 15]

METAL FRAME AND METHOD OF MANUFACTURING THE METAL FRAME FOR THE MOBILE COMMUNICATION TERMINAL

CROSS-REFERENCE TO RELATED APPLICATIONS

This application is a national phase application of PCT Application No. PCT/KR2015/008429, filed on 12 Aug. 2015, which claims benefit to Korean Patent Application No. 10-2015-0087437 filed on Jun. 19, 2015 and Korean Patent Application No. 10-2015-0087438 filed on Jun. 19, 2015. The entire disclosure of the applications identified in this paragraph are incorporated herein by reference.

TECHNICAL FIELD

The present invention relates to a metal frame for a mobile communication terminal manufactured using extrusion and a die casting die and a method of manufacturing the same, and more particularly, to a metal frame for a mobile communication terminal manufactured using extrusion and a die casting die in which a housing frame which forms an edge exterior of the mobile communication terminal and is exposed outside the mobile communication terminal is formed through extrusion, a bracket frame which supports a display panel and a main board of the mobile communication terminal and functions as a frame of an electronic product is formed through die casting to increase the efficiency of releasing heat, to reduce manufacturing costs, and to apply a color realization method through anodizing to an edge surface of the metal frame exposed outside the mobile communication terminal and a method of manufacturing the same.

BACKGROUND ART

Communication devices have been miniaturized due to the development of electrical electronic technology. Also, the mobility of communication devices has become excellent due the rapid development of mobile communication technology. Due thereto, modern people are able to conveniently carry portable terminals which provide various communication services.

Portable terminals described above may be classified depending on coupling between a body and a display and an opening/closing type into folder type portable terminals, flip type portable terminals, slide type portable terminals, swing type portable terminals, complex type portable terminals, and bar type portable terminals.

As generations of electrical electronic technology and mobile communication technology have been developed, portable terminals perform various additional functions as a so-called computer in hand more than an original use thereof such as communication at a long distance. That is, a high-definition digital camera is attached to add a camera function, and a high-capacity memory is mounted to play MP3, various games, and movies due to the development of memory technology. In addition, a generation of multi-functional cellular phones with global positioning system (GPS), online communication, etc., which are so-called smart phones, has been open.

Smart phones recently released exclude a keyboard with a plurality of buttons essentially provided on a body of a general portable terminal due to touch-screen technology and bar type portable terminals among various types of portable terminals described above become mainstream. This is because a large display panel is necessary instead of an additional keyboard and a large number of functions are added to increase a size of a main board on which a central processing unit (CPU) and various chips are mounted.

Also, as sizes of a display panel and a main board which form a mobile communication terminal increases, to discharge heat generated inside the mobile communication terminal, a bracket frame having a flat panel structure which supports the display panel and main board inside the mobile communication terminal is formed of a metal material such as a zinc alloy, an aluminum alloy, and a magnesium alloy. To provide an exclusive feeling of an external shape, a technology for applying various colors to housing frame which forms an edge exposed outside the mobile communication terminal and protects internal components from an external shock has been attempted.

To provide a color of a surface of the housing frame, typical mobile communication terminals use a method of insertion-injecting plastic into a periphery of the bracket frame formed of the metal material to form the housing frame and performing a surface treatment process on the housing frame through vapor deposition.

However, when a housing frame exposed outside a mobile communication terminal is formed of plastic like general housing frames, not only it is difficult to maintain strength for protecting internal components but also the efficiency of releasing heat generated inside to the outside is deteriorated more than a metal material forming a bracket frame.

Also, to overcome such limitations, when a housing frame is formed of the same metal material as a bracket frame and is assembled with the bracket frame using coupling means such as screws, the numbers of manufacturing processes and components increase, thereby increasing manufacturing costs.

However, FIG. 1 is a schematic diagram of a metal frame of a smart phone formed through general extrusion and a general computer numerical control (CNC) process.

In the case of a method of manufacturing the metal frame through the general extrusion and CNC process, since it is necessary to repetitively perform the CNC process on a metal material 3 having a block structure formed through the extrusion to form a metal frame 10 of a smart phone including a housing frame 1 and a bracket frame 2 shown in the drawing, manufacturing costs greatly increase due to an increase of the CNC process.

Also, when a metal frame of a mobile communication terminal is entirely formed using a die casting process to overcome such limitations, a lot of blow holes are formed on a surface of a housing frame. Even when an anodizing treatment for forming an anticorrosive oxide film is performed, it is difficult to provide colors having a feeling of high quality material which is preferred by consumers. Accordingly, since merely simple painting using paints and varnishes is possible, it is impossible to perform surface treatment to provide the feeling of high quality material.

Accordingly, there is needed a practical and applicable technology related to a metal frame of a mobile communication terminal in which a housing frame included in the metal frame of the mobile communication terminal may be formed using a metal material to effectively release heat generated inside a mobile communication terminal, a CNC process is minimized to reduce manufacturing costs, a method of providing colors for a surface of an edge of the metal frame through anodizing is applicable.

DISCLOSURE OF INVENTION

Technical Problem

One aspect of the present invention is to provide a metal frame for a mobile communication terminal manufactured using extrusion and a die casting die and a method of manufacturing the same in which a quadrangular housing frame exposed outside the mobile communication terminal is formed by cutting a square pipe metal preform formed through an extrusion process, the housing frame is inserted into a die casting die and a bracket frame which supports a display panel and a main board of the mobile communication terminal is formed by die casting, thereby not only reducing manufacturing costs by minimizing a computer numerical control (CNC) process but also forming the housing frame exposed outside the mobile communication terminal and additionally providing colors for a surface of an edge of the housing frame through anodizing.

Solution to Problem

One aspect of the present invention provides a metal frame for a mobile communication terminal, manufactured using extrusion and a die casting die, the metal frame including a housing frame formed by cutting a metal preform having a square pipe shape obtained by extruding a metal material such as an aluminum alloy to have a square ring shape having a hollow square cross section to form an edge exterior of the mobile communication terminal and a bracket frame formed using a die casting method of inserting the housing frame into the die casting die and injecting a molten metal thereinto to be a flat panel member which supports a display panel and a main board of the mobile communication terminal inside the housing frame.

A raw material of the molten metal injected into the die casting die may be one of an aluminum alloy, a zinc alloy, and a magnesium alloy.

The housing frame may include an uneven portion for casting coupling which has a concave groove shape or a convex protrusion shape formed along a circumference of an inside of the housing frame having the square ring shape to increase a coupling level with the molten metal injected into the die casting die.

In the bracket frame, an electronic component mounting hole may be formed by pressing, a display panel mounting portion may be formed by performing a computer numerical control (CNC) process on a front surface, and a tap hole for a coupling screw may be formed by performing a CNC process on a rear surface.

When surfaces of the housing frame and the bracket frame are painted by anodizing, an anticorrosive oxide film and a coating layer providing a color may be formed on an outer surface of the housing frame exposed in the air, and a nonconductive insulating film may be formed on the surface of the bracket frame.

An edge portion of the bracket frame may be etched with a laser to be able to receive an electric current, and the portion etched with the laser may be coated with a chromate coating liquid to prevent corrosion.

A die casting process for forming the bracket frame may be a process for forming a bracket frame preform which includes an under gate portion disposed at one side and an under overflow portion disposed at the other side by inserting the housing frame including an uneven portion formed on the inside into the die casting die having a shape corresponding to the bracket frame and injecting a molten metal material into the housing frame to have a structure in which the under gate portion at one side of the housing frame into which a metal material for die casting is injected and the under overflow portion is formed at the other side of the housing frame from which the metal material for die casting is discharged.

The under gate portion disposed at the one side of the bracket frame preform may include a plurality of inflow section discharge path portions formed at right angle to a direction of the molten metal at an inlet thereof to prevent impurities of the metal material for die casting and foreign substances of the metal material caused by a change in temperature and an inflow section transfer path portion which guides the metal material for die casting, whose impurities and foreign substances are minimized through the plurality of discharge path portions, into the die casting die.

The inflow section transfer path portion of the under gate portion may be formed in such a way that a fore-end is in contact with a rear surface of the bracket frame preform, a height of a transfer path for a molten metal for die casting is about 0.5 of a height of the bracket frame, a width of the transfer path for the molten metal is ⅘ of a width of one side of the bracket frame preform, and an inflow angle of the molten metal is at 30 degrees to the one side of the bracket frame preform.

The under overflow portion disposed at the other side of the bracket frame preform may include a discharge section transfer path portion for quickly discharging the impurities of the metal material for die casting which initially flows and foreign substances caused by the change in temperature, a discharge section pressure maintaining portion in which a width of the transfer path is reduced to ½ to prevent a decrease in pressure of the impurities and the foreign substances discharged through the discharge section transfer path portion, and a discharge section impurity treatment portion in which the width of the transfer path changes to collect the impurities and foreign substances which pass through the discharge section pressure maintaining portion while minimizing pressure loss.

Another aspect of the present invention provides a method of manufacturing a metal frame for a mobile communication terminal which includes a housing frame forming an edge exterior of the mobile communication terminal and exposed outside and a bracket frame formed inside an edge of the housing frame to support a display panel and a main board of the mobile communication terminal. The method includes a first operation of forming a metal preform having a square pipe shape having a hollow square cross section and a certain length by extruding a metal material of an aluminum alloy, a second operation of forming the housing frame having a square ring shape by cutting the metal preform having the square pipe shape at regular intervals in a longitudinal direction, a third operation of forming an uneven portion for coupling with a casting by performing a first CNC process along a circumference of an inside of the housing frame having the square ring shape, a fourth operation of forming a bracket frame preform which includes an under gate portion is disposed at one side and an under overflow portion is disposed at the other side by inserting the housing frame including an uneven portion formed on the inside into the die casting die having a shape corresponding to the bracket frame and injecting a molten metal material into the housing frame to have a structure in which the under gate portion at one side of the housing frame into which a metal material for die casting is injected and the under overflow portion is formed at the other side of the housing frame from which the metal material for die casting is discharged, a fifth operation of removing the under gate portion and the under overflow portion formed at the one side and the other side of the bracket frame preform by performing a second CNC process on the bracket frame preform, a sixth operation of forming one or more component mounting holes by pressing an inner surface of the bracket frame preform from which the under gate portion and the under overflow portion are removed, a seventh operation of completing the bracket frame by performing a third CNC process on the bracket frame preform including the component mounting holes, and an eighth operation of coating a surface of the metal frame including the housing frame and the bracket frame with an anticorrosive oxide film and a color through anodizing.

The method may include, before the fourth operation of performing the die casting process, performing a preheating process on the housing frame under a condition with a preheating time from 30 to 60 seconds and a preheating temperature from 200 to 250 degrees.

The uneven portion for coupling with the casting in the third operation may have one of a concave groove shape and a convex protrusion shape formed along the circumference of the inside of the housing frame having the square ring shape to increase a force for coupling with the die casting die in the die casting process of the fourth operation.

The third CNC process in the seventh operation may be a process of forming a display panel mounting portion by processing a front surface of the bracket frame preform including the component mounting holes and processing a tap hole for a coupling screw by processing a rear surface of the bracket frame preform.

The method may include, after the eighth operation of providing the anticorrosive oxide film and the color through anodizing, forming a volume key assembling groove at an outer surface of the housing frame of the metal frame, dipping and cleaning the metal frame the metal frame, etching an edge portion of the bracket frame of the metal frame with a laser, coating the portion etched with the laser with a chromate coating liquid to prevent the etched portion from being corroded, and assembling the metal frame with subsidiary materials.

The chromate coating liquid on the etched portion may be formed under a condition with a drying temperature of about 80° C., a drying time of about 30 minutes, and a thickness from 15 to 20 μm.

The under gate portion disposed at the one side of the bracket frame preform may include a plurality of inflow section discharge path portions formed at right angle to a direction of the molten metal at an inlet thereof to prevent impurities of the metal material for die casting and foreign substances of the metal material caused by a change in temperature and an inflow section transfer path portion which guides the metal material for die casting, whose impurities and foreign substances are minimized through the plurality of discharge path portions, into the die casting die.

The inflow section transfer path portion of the under gate portion may be formed in such a way that a fore-end is in contact with a rear surface of the bracket frame preform, a height of a transfer path for a molten metal for die casting is about 0.5 of a height of the bracket frame, a width of the transfer path for the molten metal is ⅘ of a width of one side of the bracket frame preform, and an inflow angle of the molten metal is at 30 degrees to the one side of the bracket frame preform.

The under overflow portion formed in the die casting process in the fourth operation and disposed at the other side of the bracket frame preform may include a discharge section transfer path portion for quickly discharging the impurities of the metal material for die casting which initially flows and foreign substances caused by the change in temperature, a discharge section pressure maintaining portion in which a width of the transfer path is reduced to ½ to prevent a decrease in pressure of the impurities and the foreign substances discharged through the discharge section transfer path portion, and a discharge section impurity treatment portion in which the width of the transfer path changes to collect the impurities and foreign substances which pass through the discharge section pressure maintaining portion while minimizing pressure loss.

A raw material of the metal material for die casting may be one of an aluminum alloy, a zinc alloy, and a magnesium alloy.

Advantageous Effects of Invention

According to the embodiments of the present invention, a housing frame which forms an edge exterior of a metal frame for a mobile communication terminal and is exposed outside the mobile communication terminal is formed through extruding and cutting, the housing frame is inserted into a die casting die, and a bracket frame which supports a display panel and a main board of the mobile communication terminal is formed through die casting, thereby not only forming the housing frame connected to the bracket frame and exposed outside the mobile communication terminal using a metal material having high heat-releasing efficiency but also reducing manufacturing costs by minimizing CNC processes for the bracket frame.

Also, a housing frame which is exposed outside a mobile communication terminal and forms an edge exterior of the mobile communication terminal is formed through extruding instead of die casting, thereby providing a color for an edge surface of the housing frame through anodizing to decorate an exterior of the mobile communication terminal with various colors.

Also, a process of preheating a housing frame formed through extruding is included before performing a die casting process in such a way that when the die casting process is performed and the housing frame is inserted into a casting die at a high temperature, thereby smoothly performing the insertion and preventing a second thermal deformation from occurring during a casting process.

Also, when extruding and die casting processes are performed and then a housing frame and a bracket frame are anodized while being coupled with each other, since a nonconductive insulating film is formed on a surface of the bracket frame, an insulating coating process necessary after a general die casting process is unnecessary, thereby additionally reducing manufacturing operations.

Also, an uneven portion having a groove shape or a protrusion shape is formed along a circumference of an inside of a housing frame, thereby strengthening a coupling structure of a bracket frame formed through die casting.

Also, in a die casting process, an under gate portion and an under overflow portion are formed at one side and the other side of a housing frame inserted into a die casting die, thereby preventing the housing frame from being deformed and forming a bracket frame having a uniform density.

Also, a die casting process having a structure in which a bracket frame covers a rear surface of a mobile communication terminal may be applied in such a way that it is possible to apply the die casting process to a metal frame of a mobile communication terminal in which a bracket frame is integrally connected to a rear case of the mobile communication terminal.

BRIEF DESCRIPTION OF DRAWINGS

FIG. 1 is a schematic diagram of a metal frame of a smart phone formed through general extrusion and a general computer numerical control (CNC) process.

FIG. 2 is a flowchart illustrating a method of manufacturing a metal frame for a mobile communication terminal according to one embodiment of the present invention.

FIG. 3 is a schematic process chart illustrating a manufacturing process shown in FIG. 2.

FIG. 4 is a schematic diagram of a metal preform formed through an extrusion process and a housing frame formed by cutting shown in FIG. 2.

FIG. 5 is a schematic diagram of an uneven portion for coupling a casting formed inside the housing frame through a first CNC process shown in FIG. 2.

FIG. 6 is a schematic diagram illustrating an under gate portion and an under overflow portion formed at one side and the other side of the housing frame to perform a die casting process shown in FIG. 2.

FIG. 7 is a view of a bracket frame preform formed through the die casting process shown in FIG. 2.

FIG. 8 is a view schematically illustrating a process of removing the under gate portion and the under overflow portion through a second CNC process shown in FIG. 2.

FIG. 9 is a view of the bracket frame preform from which the under gate portion and the under overflow portion are removed as shown in FIG. 8.

FIG. 10 is a cross-sectional view of a bracket frame coupled with the housing frame according to the embodiment of the present invention.

FIG. 11 is a schematic view of the bracket frame preform including a hole for mounting an electronic component formed through a pressing process shown in FIG. 2.

FIG. 12 is a schematic view of the bracket frame preform including a tap for a coupling screw formed through a third CNC process shown in FIG. 2.

FIG. 13 is a schematic view of the under gate portion and the under overflow portion formed at the one side and the other side of the housing frame according to the embodiment of the present invention.

FIG. 14 is a schematic view of a die casting die in which the under gate portion and the under overflow portion shown in FIG. 13 are formed.

FIG. 15 is a schematic view illustrating examples of the bracket frame preform applicable to the die casting process shown in FIG. 2 according to the embodiment of the present invention.

MODE FOR THE INVENTION

Embodiments of the present invention will be structurally or functionally described. The scope of the present invention will not be limited to the embodiments described herein. That is, since the embodiments may be variously modified and may have various forms, the scope of the present invention will be understood as including equivalents thereof which can realize technical concept thereof.

Meanwhile, the meaning of terms described herein will be understood as follows.

It will be understood that although the terms "first", "second", etc. may be used herein to describe various components, these components should not be limited by these terms. These terms are only used to distinguish one component from another. For example, a first component may be designated as a second component, and similarly, the second component may be designated as the first component.

It will be understood that when a component is referred to as being "connected to" another component, it can be directly or indirectly connected to the other component. That is, for example, intervening components may be present. On the contrary, when a component is referred to as being "directly connected to" another component, it will be understood that there is no intervening components. Meanwhile, other expressions which describe relationships between components, that is, "between" and "directly between" or "adjacent to" and "directly adjacent to" will be also understood similarly thereto.

Singular expressions, unless defined otherwise in contexts, include plural expressions. Terms of "comprise" or "have" are used to designate features, numbers, steps, operations, elements, components or combinations thereof disclosed in the specification as being present but not to exclude possibility of the existence or the addition of one or more other features, numbers, steps, operations, elements, components, or combinations thereof.

In respective steps, reference symbols, for example, a, b, c, etc. are used for convenience of description. These reference symbols do not indicate an order of the respective steps. The respective steps may be performed differently from a specified order unless a particular order is not defined clearly in contexts. That is, the respective steps may be performed identically to the specified order, may be performed actually at the same time, and may be performed in the reverse order.

All terms used herein, unless defined otherwise, have the same meaning generally understood by one of ordinary skill in the art. Terms defined in generally used dictionaries may be understood as contextual meanings generally known in the art, and unless defined clearly in the specification, will not be understood as having ideally or excessively formal meanings.

A method of manufacturing a metal frame for a mobile communication terminal according to one embodiment of the present invention relates to a method of manufacturing a metal frame for a mobile communication terminal, which includes a housing frame configured to form an edge exterior of the mobile communication terminal and to be exposed outside and a bracket frame formed inside an edge of the housing frame and configured to support a display panel and a main board of the mobile communication terminal.

Hereinafter, the embodiments of the present invention will be described in detail with reference to the attached drawings.

FIG. 2 is a flowchart illustrating the method of manufacturing the metal frame for the mobile communication terminal according to one embodiment of the present invention. FIG. 3 is a schematic process chart illustrating a manufacturing process shown in FIG. 2.

As shown in the drawings, the method of manufacturing the metal frame for the mobile communication terminal according to the embodiment of the present invention includes forming a metal preform 100 through an extruding process (S10), forming a housing frame 200 through cutting (S20), forming an uneven portion 210 through a first computer numerical control (CNC) process (S30), forming a bracket frame preform 300 through a die casting process (S40), removing an under gate portion 500 and an under overflow portion 600 through a second CNC process (S50), forming a component mounting hole 310 through a pressing process, completing a bracket frame 400 through a third CNC process (S70), and coating an oxide film and a color through an anodizing process (S80).

In more detail, the forming of the metal preform 100 through the extruding process (S10) may be a first operation of forming the metal preform 100 having a square pipe shape with a hollow square cross section and a certain length by extruding a metal material of an aluminum alloy.

Next, the forming of the housing frame 200 through cutting (S20) may be a second operation of forming the housing frame 200 having a square ring shape by cutting the metal preform 100 having the square pipe shape at regular intervals in a longitudinal direction.

Next, the forming of the uneven portion 210 through the first CNC process (S30) may be a third operation of forming the uneven portion 210 for coupling with a casting by performing the first CNC process along a circumference of an inside of the housing frame 200 having the square ring shape.

Next, the forming of the bracket preform 300 through the die casting process (S40) may be a fourth operation of forming the bracket frame preform 300 which includes the under gate portion 500 disposed at one side and the under overflow portion 600 disposed at the other side by inserting the housing frame 200 including the uneven portion 210 formed on the inside thereof into a die casting die having a shape corresponding to the bracket frame 400 and then injecting a molten metal material into the housing frame 200 to have a structure in which the under gate portion 500 is formed at one side of the housing frame 200 into which a metal material for die casting is injected and the under overflow portion 600 is formed at the other side of the housing frame 200 through which the metal material for die casting is discharged.

Next, the removing of the under gate portion 500 and the under overflow portion 600 through the second CNC process (S50) may be a fifth operation of removing the under gate portion 500 and the under overflow portion 600 formed at the one side and the other side of the bracket frame preform 300 by performing the second CNC process on the bracket frame preform 300.

Next, the forming of the component mounting hole 310 through the pressing process (S60) may be a sixth operation of forming one or more component mounting holes 310 by pressing an inner surface of the bracket frame preform 300 from which the under gate portion 500 and the under overflow portion 600 are removed.

Next, the completing of the bracket frame 400 through the third CNC process (S70) may be a seventh operation of completing the bracket frame 400 by performing the third CNC process on the bracket frame preform 300 including the component mounting hole 310 formed therein.

Finally, the coating of the oxide film and the color through anodizing (S80) may be an eighth operation of coating a surface of the metal frame including the housing frame 200 and the bracket frame 400 with an anticorrosive oxide film and a color.

Here, the anodizing indicates a plating method using properties in which when aluminum is to be an anode and an electric current is applied thereto, a surface of the aluminum is oxidized by oxygen generated at the anode and an aluminum oxide film is formed. In addition to an anticorrosion effect, the housing frame 200 formed through extruding may have an anodizing effect which provides excellent surface treatment such as providing bright colors preferred by consumers.

On the contrary, in the case of a portion formed through a die casting process such as the bracket frame 400, even when anodizing is performed, a bright color is not available and becomes dark. Accordingly, the die casting process may be applied to form an anticorrosive oxide film rather than being applied to the exterior of the mobile communication terminal.

Also, since the anodizing treatment in the embodiment of the present invention may allow a surface of a bracket frame forming a metal frame of a mobile communication terminal to be a nonconductive state, it is unnecessary to perform an additional insulating coating process, compared with general die casting processes.

Also, in the method of manufacturing the metal frame for the mobile communication terminal according to the embodiment of the present invention, before the anodizing treatment, subsidiary materials formed of plastic and a decorative component may be formed outside the metal frame through insertion-injecting as necessary.

Also, although not shown in the drawings, the method of manufacturing the metal frame for the mobile communication terminal may include, after the eighth operation (S80) of providing the anticorrosive oxide film and the color through anodizing, forming a volume key assembling groove on an outside of the housing frame 200 of the metal frame, dipping and cleaning the metal frame, etching an edge portion of the bracket frame 400 with a laser, coating the etched portion with a chromate film liquid to prevent the portion etched with the laser from being corroded, and assembling the metal frame with subsidiary materials.

Here, the chromate film liquid on the etched portion may be formed under a condition with a drying temperature of about 80° C., a drying time of about 30 minutes, and a thickness from 15 to 20 μm.

Referring to FIGS. 4 to 15, the method of manufacturing the metal frame according to the embodiment of the present invention shown in FIGS. 2 and 3 will be described in detail.

FIG. 4 is a schematic diagram of the metal preform formed through the extrusion process and the housing frame formed through the cutting process shown in FIG. 2.

As shown in the drawings, in the method of manufacturing the metal frame applied to the embodiment of the present invention, the extrusion process is performed using an extrusion material such as an aluminum alloy preferred by consumers to form an edge exterior exposed outside a mobile communication terminal, thereby obtaining the metal preform 100 having the square pipe shape.

Here, the extrusion material applied to the embodiment of the present invention is an aluminum alloy in a series of 60XX and more particularly may be 6061 or 6063.

Also, the extrusion applied to the embodiment of the present invention is a manufacturing process for manufacturing an aluminum extrusion component used as construction materials and industrial materials, in which a billet having high plasticity is inserted into a chamber and extruded through a die orifice using intense pressure to obtain various section members and tubular members which may have a regular cross section shape such as the square pipe shape shown in the drawing because a shape of a die is generally fixed.

As described above, the metal preform 100 having the square pipe shape formed through the extrusion process may be cut through the cutting process, thereby obtaining the housing frame 200 having the square ring shape as shown in the drawing.

Here, in the embodiment of the present invention, for mass production, the metal preform 100 having a square cross section with a width from 150 to 200 mm, a height from 50 to 100 mm, and a thickness from 5 to 10 mm is extruded with a length of about 10 m and cut at regular intervals from 8 to 15 mm, thereby manufacturing the housing frame 200 used as a metal edge for the mobile communication terminal.

An edge of the housing frame 200 obtained by cutting the metal preform 100 at regular intervals may be processed to be a curve. Here, a radius of a circular arc may be from 3 to 10 mm.

FIG. 5 is a schematic diagram of the uneven portion for coupling a casting formed inside the housing frame through the first CNC process shown in FIG. 2.

Referring to FIG. 15 which will be described below, the uneven portion 210 for coupling the casting formed in the third operation (S30) has a shape of a concave groove 220 or a convex protrusion 230 formed along the inside of the housing frame 200 having the square ring shape to increase a force for coupling with a metal material for die casting injected in the die casting process in the fourth operation (S40). In the embodiment of the present invention, as shown in FIG. 5, the uneven portion 210 may have a groove shape by performing a CNC process on the inside of the housing frame 200.

Here, the uneven portion 210 formed inside the extrusion material may be processed with a processing width from 0.5 to 1 mm and a processing depth from 0.5 to 1 mm while being at a right angle to a tool (not shown) for performing the CNC process and a groove included in the uneven portion is filled with a cast for casting in the die casting process which will be described below, thereby physically coupling.

Also, the uneven portion 210, as necessary, may be secondarily processed at an angle from 100 to 120 degrees to the processing tool, thereby increasing a coupling force.

FIG. 6 is a schematic diagram illustrating the under gate portion and the overflow formed at one side and the other side of the housing frame to perform the die casting process shown in FIG. 2. FIG. 7 is a view of the bracket frame preform formed through the die casting process shown in FIG. 2.

Referring to FIGS. 6 and 7, the die casting process (S40) included in the method of manufacturing the metal frame according to the embodiment of the present invention will be described as follows.

The die casting process applied to the embodiment of the present invention is one of casting processes generally used as a method of processing a metal material. Generally, casting is to inject a molten metal into various casts to solidify. A die casting process indicates casting using a die.

That is, the die casting process applied to the embodiment of the present invention is an investment casting method of obtaining a cast identical to a die by injecting a molten metal into a die casting die formed of steel and precisely mechanically processed to be perfectly identical to a necessary shape corresponding to the bracket frame 400 included in the metal frame for the mobile communication terminal.

Meanwhile, the metal material for die casting is a molten metal whose raw material is one of an aluminum alloy, a zinc alloy, and a magnesium alloy. In the embodiment of the present invention, the metal material may be a magnesium alloy AZ91D or an aluminum alloy ADC12.

Generally, metal products manufactured through a general die casting method are applied to exteriors of mobile communication terminals due to high productivity and low costs. However, compared with metal products manufactured through an extruding method, an anodizing effect is lower. Accordingly, the die casting process is applied to a process of forming a bracket frame like one embodiment of the present invention shown in FIG. 15 which will be described below and a structure in which a rear case and a bracket frame are integrally connected like another embodiment of the present invention.

Also, as shown in the drawings, in the method of manufacturing the metal frame according to the embodiment of the present invention, to prevent a deformation of the housing frame 200 formed through the extrusion process in the die casting process, the under gate portion 500 may be formed at the onside of the housing frame 200 and the under overflow portion 600 may be formed at the other side of the housing frame 200.

That is, the under gate portion 500 may form a path through which the metal material for die casting is injected and the under overflow portion 600 may allow a gas to be discharged outside and allows the density of a product to be uniform, thereby uniformly forming the product during the die casting process.

Here, ends of a gate portion and a flow portion which are formed to be an inlet and an outlet for a molten metal material injected into a die casting die and discharged therefrom may be formed at a longitudinal side portion of the die in a general die casting process. However, in the embodiment of the present invention, as shown in FIG. 6, they are formed at a lower portion of the die, that is, a rear surface of the mobile communication.

As described above, in the embodiment of the present invention, gate and flow portions may have an under gate structure and an under overflow structure to allow a flow of the molten metal to be smooth and to increase plasticity by inducing a discharge of the gas in a casting process.

Shapes of the under gate portion 500 and the under overflow portion 600 applied to the embodiment of the present invention will be described in detail with reference to FIGS. 13 and 14.

Meanwhile, in the embodiment of the present invention, not shown in the drawings, before performing the die casting process, a process of preheating the housing frame 200 may be performed under a condition with a preheating time from 30 to 60 seconds and a preheating temperature from 200 to 250° C.

That is, since a temperature of the die casting die is very higher than that of plastic injection, the die thermally expands at a high temperature. Accordingly, it is impossible to insert an object of insertion without preheating. It is necessary to insert the object after adjusting a degree of thermal expansion thereof to correspond to that of the die through the preheating process.

As described above, in the method of manufacturing the metal frame according to the embodiment of the present invention, since the housing frame 200 is preheated and thermally expands to be smoothly inserted into the die casting die and a secondary the occurrence of thermal deformation during the casting process may be prevented. Here, the preheated housing frame 200 may be inserted into the die casting die generally using a robot due to a high temperature.

FIG. 8 is a view schematically illustrating the process of removing the under gate portion and the under overflow portion through the second CNC process shown in FIG. 2.

FIG. 9 is a view of the bracket frame preform from which the under gate portion and the under overflow portion are removed as shown in FIG. 8. FIG. 10 is a cross-sectional view of the bracket frame coupled with the housing frame according to the embodiment of the present invention.

Referring to FIGS. 8 and 10, the method of manufacturing the metal frame according to the embodiment of the present invention and the metal frame manufactured using the method will be described as follows.

As shown in the drawings, in the embodiment of the present invention, due to the second CNC process shown in FIG. 2 described above, the under gate portion 500 and the under overflow portion 600 formed at the one side and the other side of the housing frame 200 during the die casting process may be removed and the bracket frame 400 may be strongly coupled with the inside of the housing frame 200 through the die casting process.

FIG. 11 is a schematic view of the bracket frame preform including the hole for mounting an electronic component through the pressing process shown in FIG. 2. FIG. 12 is a schematic view of the bracket frame preform including a tap for a coupling screw formed through a third CNC process shown in FIG. 2.

As shown in the drawings, in the method of manufacturing the metal frame according to the embodiment of the present invention, the pressing process and the third CNC process are performed after the second CNC process. The pressing process is an operation of forming the component mounting hole 310 which is not formed in the die casting process, and the third CNC process is an operation of forming the tap hole 410 for screw-coupling which needs precise processing after the pressing process.

Here, in the embodiment of the present invention, the third CNC process (S70) is a process in which a display panel mounting portion is formed by processing a front surface of the bracket frame preform 300 including the component mounting hole 310 formed therein and a tap hole for a coupling screw for mounting the main board and electronic components is formed by processing a rear surface of the bracket frame preform 300, which is an operation of finally completing the bracket frame 400 of the metal frame for the mobile communication terminal.

Next, referring to FIGS. 13 and 14, structures of the under gate portion and the under overflow portion formed at one side and the other side of the housing frame in the die casting process that is the fourth operation of the method of manufacturing the metal frame for the mobile communication terminal according to the embodiment of the present invention will be described in detail as follows.

FIG. 13 is a schematic view of the under gate portion and the under overflow portion formed at the one side and the other side of the housing frame according to the embodiment of the present invention. FIG. 14 is a schematic view of a die casting die in which the under gate portion and the under overflow portion shown in FIG. 13 are formed.

As shown in the drawings, through the die casting process of the fourth operation (S40) described above, the die casting die may be provided while having a structure in which the under gate portion 500 is formed at the one side of the housing frame 200 and the under overflow portion 600 is formed at the other side of the housing frame 200.

Here, the under gate portion 500 disposed at the one side of the bracket frame preform 300 formed in the die casting process may include a plurality of inflow section discharge path portions 510 and an inflow section transfer path portion 520.

Here, the inflow section discharge path portions 510 may have a shape having a structure formed at an inlet of a molten metal at a right angle to a transfer direction thereof to prevent impurities of the metal material for die casting and foreign substances of the metal material caused by a change in temperature from flowing into the die casting die.

Also, the inflow section transfer path portion 520 may guide the metal material for die casting in which the impurities and foreign substances are minimized by the plurality of inflow section discharge path portion 510 into the die casting die.

That is, in more detail, the inflow section transfer path portion 520 of the under gate portion 500 may be formed in such a way that a fore-end is in contact with the rear surface of the bracket frame preform 300, a height of a transfer path for a molten metal for die casting is 0.5 of a height of the bracket frame preform 300, a width of the transfer path for the molten metal is ⅘ of a width of the one side of the bracket frame preform 300, and an inflow angle of the molten metal is at 30 degrees to the one side of the bracket frame preform 300.

Meanwhile, the under overflow portion 600 disposed at the other side of the bracket frame preform 300 formed in the die casting process in the fourth operation (S40) may include a discharge section transfer path portion 610 for quickly discharging the impurities of the metal material for die casting, which initially flows, and foreign substances caused by a change in temperature, a discharge section pressure maintaining portion 620 in which a width of the transfer path is reduced to prevent the pressure of the impurities and foreign substances which pass through the discharge section transfer path portion 610 and are discharged, and a discharge section impurity treatment portion 630 in which the width of the transfer path changes to collect the impurities and foreign substances passing through the discharge section pressure maintaining portion 620 while minimizing pressure loss.

FIG. 15 is a schematic view illustrating examples of the bracket frame preform applicable to the die casting process shown in FIG. 2 according to the embodiment of the present invention.

As described above, in the embodiment of the present invention, for strong coupling between the housing frame 200 formed through extruding and the bracket frame 400 formed through the die casting process, the groove 220 or the protrusion 230 may be formed at the inside of the housing frame 200 through the first CNC process of the third operation (S30).

Here, due to the groove 220 or the protrusion 230, a physical coupling structure may be provided in the die casting process and a coupling portion thereof contracts when a die cast casting is cooled, thereby maintaining stronger coupling.

Also, as shown in the drawings, in another example, a structure of the die casting die may be changed to allow an outside of the bracket frame 400 to cover the rear surface of the mobile communication terminal. That is, also to the structure of integrally connecting the rear case with the bracket frame of the mobile communication terminal, the method of manufacturing the metal frame for the mobile communication terminal and the metal frame for the mobile communication terminal according to the embodiment of the present invention may be applied.

As described above, according to the embodiments of the present invention, a housing frame which forms an edge exterior of a metal frame for a mobile communication terminal and is exposed outside the mobile communication terminal is formed through extruding and cutting, the housing frame is inserted into a die casting die, and a bracket frame which supports a display panel and a main board of the mobile communication terminal is formed through die casting, thereby not only forming the housing frame connected to the bracket frame and exposed outside the mobile communication terminal using a metal material having high heat-releasing efficiency but also reducing manufacturing costs by minimizing CNC processes for the bracket frame.

Also, a housing frame which is exposed outside a mobile communication terminal and forms an edge exterior of the mobile communication terminal is formed through extruding instead of die casting, thereby providing a color for an edge surface of the housing frame through anodizing to decorate an exterior of the mobile communication terminal with various colors.

Also, a process of preheating a housing frame formed through extruding is included before performing a die casting process in such a way that when the die casting process is performed and the housing frame is inserted into a casting die at a high temperature, thereby smoothly performing the insertion and preventing a second thermal deformation from occurring during a casting process.

Also, when extruding and die casting processes are performed and then a housing frame and a bracket frame are anodized while being coupled with each other, since a nonconductive insulating film is formed on a surface of the bracket frame, an insulating coating process necessary after a general die casting process is unnecessary, thereby additionally reducing manufacturing operations.

Also, an uneven portion having a groove shape or a protrusion shape is formed along a circumference of an inside of a housing frame, thereby strengthening a coupling structure of a bracket frame formed through die casting.

Also, in a die casting process, an under gate portion and an under overflow portion are formed at one side and the other side of a housing frame to be inserted into a die casting die, thereby preventing the housing frame from being deformed and forming a bracket frame having a uniform density.

Also, a die casting process having a structure in which a bracket frame covers a rear surface of a mobile communication terminal may be applied in such a way that it is possible to apply the die casting process to a metal frame of a mobile communication terminal in which a bracket frame is integrally connected to a rear case of the mobile communication terminal.

Although a few embodiments of the present invention have been shown and described, it would be appreciated by those skilled in the art that changes may be made in these embodiments without departing from the principles and spirit of the invention, the scope of which is defined in the claims and their equivalents.

INDUSTRIAL APPLICABILITY

The present invention will be applied to the field of manufacturing a metal frame for a mobile communication terminal.

The invention claimed is:
1. A metal frame for a mobile communication terminal, manufactured using extrusion and a die casting die, the metal frame comprising:
   a housing frame formed by cutting a metal preform having a square pipe shape obtained by extruding a metal material such as an aluminum alloy to have a square ring shape having a hollow square cross section to form an exterior edge of the mobile communication terminal; and
   a bracket frame formed using a die casting method of inserting the housing frame into the die casting die and injecting a molten metal therein to form a flat panel member which supports a display panel and a main board of the mobile communication terminal inside the housing frame;
   wherein the die casting process for forming the bracket frame is a process for forming a bracket frame preform which comprises an under gate portion disposed at one side and an under overflow portion disposed at the other side, by inserting the housing frame comprising an uneven portion formed on the inside into the die casting die having a shape corresponding to the bracket frame, and injecting the molten metal material into the housing frame to form a structure in which the under gate portion is disposed at the one side of the housing frame into which the metal material for die casting is injected and the under overflow portion is formed at the other side of the housing frame from which the metal material for die casting is discharged.

2. The metal frame of claim 1, wherein a raw material of the molten metal injected into the die casting die is one of an aluminum alloy, a zinc alloy, and a magnesium alloy.

3. The metal frame of claim 1, wherein the housing frame comprises an uneven portion for casting coupling which has a concave groove shape or a convex protrusion shape formed along a circumference of an inside of the housing frame having the square ring shape to increase a coupling level with the molten metal injected into the die casting die.

4. The metal frame of claim 1, wherein in the bracket frame, an electronic component mounting hole is formed by pressing, a display panel mounting portion is formed by performing a computer numerical control (CNC) process on a front surface, and a tap hole for a coupling screw is formed by performing a CNC process on a rear surface.

5. The metal frame of claim 1, wherein when surfaces of the housing frame and the bracket frame are painted by anodizing, an anticorrosive oxide film and a coating layer providing a color are formed on an outer surface of the housing frame exposed in the air, and a nonconductive insulating film is formed on the surface of the bracket frame.

6. The metal frame of claim 5, wherein an edge portion of the bracket frame is etched with a laser to receive an electric current, and wherein the portion etched with the laser is coated with a chromate coating liquid to prevent corrosion.

7. The metal frame of claim 1, wherein the under gate portion disposed at the one side of the bracket frame preform comprises:
   a plurality of inflow section discharge path portions formed at a right angle to a direction of the molten metal at an inlet thereof to prevent impurities of the metal material for die casting and foreign substances of the metal material caused by a change in temperature; and
   an inflow section transfer path portion which guides the metal material for die casting, whose impurities and foreign substances are minimized through the plurality of discharge path portions, into the die casting die.

8. The metal frame of claim 7, wherein the inflow section transfer path portion of the under gate portion is formed in such a way that a fore-end is in contact with a rear surface of the bracket frame preform, a height of a transfer path for the molten metal for die casting is 0.5 of a height of the bracket frame, a width of the transfer path for the molten metal is ⅘ of a width of one side of the bracket frame preform, and an inflow angle of the molten metal is at 30 degrees to the one side of the bracket frame preform.

9. The metal frame of claim 7, wherein the under overflow portion disposed at the other side of the bracket frame preform comprises:
   a discharge section transfer path portion for quickly discharging the impurities of the metal material for die casting which initially flows and foreign substances caused by the change in temperature;
   a discharge section pressure maintaining portion in which a width of the transfer path is reduced to ½ to prevent a decrease in pressure of the impurities and the foreign substances discharged through the discharge section transfer path portion; and
   a discharge section impurity treatment portion in which the width of the transfer path changes to collect the impurities and foreign substances which pass through the discharge section pressure maintaining portion while minimizing pressure loss.

10. A method of manufacturing a metal frame for a mobile communication terminal which comprises a housing frame forming an exterior edge of the mobile communication terminal and exposed outside, and a bracket frame formed inside an edge of the housing frame to support a display panel and a main board of the mobile communication terminal, the method comprising:
   a first operation of forming a metal preform having a square pipe shape having a hollow square cross section and a certain length by extruding a metal material of an aluminum alloy;
   a second operation of forming the housing frame having a square ring shape by cutting the metal preform having the square pipe shape at regular intervals in a longitudinal direction;
   a third operation of forming an uneven portion for coupling with a casting by performing a first CNC process along a circumference of an inside of the housing frame having the square ring shape;
   a fourth operation of forming a bracket frame preform which comprises an under gate portion disposed at one side and an under overflow portion disposed at the other side, by inserting the housing frame comprising an uneven portion formed on the inside into the die casting die having a shape corresponding to the bracket frame, and injecting a molten metal material into the housing frame to have a structure in which the under gate portion is disposed at one side of the housing frame into which a metal material for die casting is injected and the under overflow portion is formed at the other side of the housing frame from which the metal material for die casting is discharged;
   a fifth operation of removing the under gate portion and the under overflow portion formed at the one side and the other side of the bracket frame preform by performing a second CNC process on the bracket frame preform;
   a sixth operation of forming one or more component mounting holes by pressing an inner surface of the bracket frame preform from which the under gate portion and the under overflow portion are removed;
   a seventh operation of completing the bracket frame by performing a third CNC process on the bracket frame preform comprising the component mounting holes; and
   an eighth operation of coating a surface of the metal frame comprising the housing frame and the bracket frame with an anticorrosive oxide film and a color through anodizing.

11. The method of claim 10, comprising, before the fourth operation of performing the die casting process, performing a preheating process on the housing frame under a condition with a preheating time from 30 to 60 seconds and a preheating temperature from 200 to 250 degrees.

12. The method of claim 10, wherein the uneven portion for coupling with the casting in the third operation has one of a concave groove shape and a convex protrusion shape formed along the circumference of the inside of the housing frame having the square ring shape to increase a force for coupling with the die casting die in the die casting process of the fourth operation.

13. The method of claim 10, wherein the third CNC process in the seventh operation is a process of forming a display panel mounting portion by processing a front surface of the bracket frame preform comprising the component mounting holes and processing a tap hole for a coupling screw by processing a rear surface of the bracket frame preform.

14. The method of claim 10, comprising, after the eighth operation of providing the anticorrosive oxide film and the color through anodizing:
   forming a volume key assembling groove at an outer surface of the housing frame of the metal frame;
   dipping and cleaning the metal frame;
   etching an edge portion of the bracket frame of the metal frame with a laser;
   coating the portion etched with the laser with a chromate coating liquid to prevent the etched portion from being corroded; and
   assembling the metal frame with subsidiary materials.

15. The method of claim 14, wherein the chromate coating liquid on the etched portion is formed under a condition with a drying temperature of 80° C., a drying time of 30 minutes, and a thickness from 15 to 20 μm.

16. The method of claim 10, wherein the under gate portion disposed at the one side of the bracket frame preform comprises:
   a plurality of inflow section discharge path portions formed at a right angle to a direction of the molten metal at an inlet thereof to prevent impurities of the metal material for die casting and foreign substances of the metal material caused by a change in temperature; and
   an inflow section transfer path portion which guides the metal material for die casting, whose impurities and foreign substances are minimized through the plurality of discharge path portions, into the die casting die.

17. The method of claim 16, wherein the inflow section transfer path portion of the under gate portion is formed in such a way that a fore-end is in contact with a rear surface of the bracket frame preform, a height of a transfer path for a molten metal for die casting is 0.5 of a height of the bracket frame, a width of the transfer path for the molten metal is ⅘ of a width of one side of the bracket frame preform, and an inflow angle of the molten metal is at 30 degrees to the one side of the bracket frame preform.

18. The method of claim 16, wherein the under overflow portion formed in the die casting process in the fourth operation and disposed at the other side of the bracket frame preform comprises:
   a discharge section transfer path portion for quickly discharging the impurities of the metal material for die casting which initially flows and foreign substances caused by the change in temperature;

a discharge section pressure maintaining portion in which a width of the transfer path is reduced to ½ to prevent a decrease in pressure of the impurities and the foreign substances discharged through the discharge section transfer path portion; and a discharge section impurity treatment portion in which the width of the transfer path changes to collect the impurities and foreign substances which pass through the discharge section pressure maintaining portion while minimizing pressure loss.

19. The method of claim 10, wherein a raw material of the metal material for die casting is one of an aluminum alloy, a zinc alloy, and a magnesium alloy.

\* \* \* \* \*